US009508360B2

(12) United States Patent
Allam et al.

(10) Patent No.: US 9,508,360 B2
(45) Date of Patent: Nov. 29, 2016

(54) SEMANTIC-FREE TEXT ANALYSIS FOR IDENTIFYING TRAITS

(71) Applicant: INTERNATIONAL BUSINESS MACHINES CORPORATION, Armonk, NY (US)

(72) Inventors: Sushmita L. Allam, Bangalore (IN); Guillermo A. Cecchi, New York, NY (US); Srinivas Gundugola, Bangalore (IN); James R. Kozloski, New Fairfield, CT (US); Clifford A. Pickover, Yorktown Heights, NY (US); Irina Rish, Rye Brook, NY (US)

(73) Assignee: International Business Machines Corporation, Armonk, NY (US)

( * ) Notice: Subject to any disclaimer, the term of this patent is extended or adjusted under 35 U.S.C. 154(b) by 368 days.

(21) Appl. No.: 14/288,751

(22) Filed: May 28, 2014

(65) Prior Publication Data

US 2015/0348569 A1   Dec. 3, 2015

(51) Int. Cl.
*G10L 15/00* (2013.01)
*G10L 25/48* (2013.01)
*G10L 15/18* (2013.01)

(52) U.S. Cl.
CPC ........... *G10L 25/48* (2013.01); *G10L 15/1815* (2013.01)

(58) Field of Classification Search
CPC ....... G10L 17/26; G10L 25/48; G10L 17/00; G10L 17/04; G06F 17/30684; G06Q 20/40145
USPC ....... 726/7, 28; 715/811, 233; 707/769, 732; 706/20; 705/44; 704/9, 7, 275, 272, 704/270, 257, 256, 252, 251, 246, 232, 209
See application file for complete search history.

(56) References Cited

U.S. PATENT DOCUMENTS

| | | | | |
|---|---|---|---|---|
| 5,884,247 A | * | 3/1999 | Christy | ............... G06F 17/2872 704/4 |
| 5,884,259 A | * | 3/1999 | Bahl | ....................... G10L 15/08 704/242 |
| 5,987,415 A | * | 11/1999 | Breese | .................... G10L 17/26 704/270 |

(Continued)

FOREIGN PATENT DOCUMENTS

| | | |
|---|---|---|
| EP | 2296111 A1 | 3/2011 |
| WO | 0250703 A1 | 6/2002 |

(Continued)

OTHER PUBLICATIONS

N. Mota et al, "Speech Graphs Provide a Quantitative Measure of Thought Disorder in Psychosis", Plos One, plosone.org, vol. 7, Issue 4, Apr. 2012, pp. 1-9.

(Continued)

*Primary Examiner* — Michael Colucci
(74) *Attorney, Agent, or Firm* — Law Office of Jim Boice

(57) ABSTRACT

A method, system, and/or computer program product uses speech traits of an entity to predict a future state of the entity. Units of speech are collected from a stream of speech that is generated by a first entity. Tokens from the stream of speech are identified, where each token identifies a particular unit of speech from the stream of speech, and where identification of the tokens is semantic-free. Nodes in a first speech graph are populated with the tokens, and a first shape of the first speech graph is identified. The first shape is matched to a second shape, where the second shape is of a second speech graph from a second entity in a known category. The first entity is assigned to the known category, and a future state of the first entity is predicted based on the first entity being assigned to the known category.

20 Claims, 9 Drawing Sheets

(56) References Cited

U.S. PATENT DOCUMENTS

| | | | | |
|---|---|---|---|---|
| 6,151,571 | A * | 11/2000 | Pertrushin | G10L 17/26 704/207 |
| 6,275,806 | B1 * | 8/2001 | Pertrushin | G10L 17/26 704/270 |
| 6,721,704 | B1 * | 4/2004 | Strubbe | G10L 25/48 379/88.01 |
| 6,829,603 | B1 * | 12/2004 | Chai | G06F 17/30684 |
| 6,889,217 | B2 * | 5/2005 | Hutchison | G06N 3/08 706/19 |
| 6,964,023 | B2 * | 11/2005 | Maes | G06F 3/0481 704/E15.041 |
| 7,606,714 | B2 * | 10/2009 | Williams | G10L 13/027 379/265.02 |
| 8,145,474 | B1 * | 3/2012 | Daily | G06F 11/2257 704/10 |
| 8,412,530 | B2 * | 4/2013 | Pereg | G06F 17/279 704/270 |
| 8,719,952 | B1 * | 5/2014 | Damm-Goossens | H04L 9/0825 380/285 |
| 8,725,728 | B1 * | 5/2014 | King | G06F 17/30648 707/732 |
| 8,739,260 | B1 * | 5/2014 | Damm-Goossens | H04W 12/06 726/4 |
| 2006/0053012 | A1 * | 3/2006 | Eayrs | G10L 21/06 704/251 |
| 2006/0122834 | A1 * | 6/2006 | Bennett | G10L 15/1822 704/256 |
| 2009/0287489 | A1 * | 11/2009 | Savant | G10L 15/07 704/246 |
| 2011/0055256 | A1 * | 3/2011 | Phillips | G10L 15/30 707/769 |
| 2013/0138428 | A1 | 5/2013 | Chandramouli et al. | |
| 2014/0046891 | A1 | 2/2014 | Banas | |
| 2014/0113263 | A1 | 4/2014 | Jarrell et al. | |
| 2014/0214676 | A1 * | 7/2014 | Bukai | G06Q 20/12 705/44 |
| 2014/0270109 | A1 | 9/2014 | Riahi et al. | |
| 2014/0297268 | A1 | 10/2014 | Govrin et al. | |
| 2015/0134330 | A1 * | 5/2015 | Baldwin | G06F 21/32 704/232 |
| 2015/0220504 | A1 * | 8/2015 | Bocanegra Alvarez | G06F 17/241 715/233 |
| 2015/0348569 | A1 * | 12/2015 | Allam | G10L 15/1815 704/257 |

FOREIGN PATENT DOCUMENTS

| | | |
|---|---|---|
| WO | 0251114 A1 | 6/2002 |
| WO | 2004114207 A2 | 12/2004 |
| WO | 2012125653 A1 | 9/2012 |
| WO | 2012160193 A1 | 11/2012 |

OTHER PUBLICATIONS

List of IBM Patents or Patent Applications Treated as Related, Jun. 24, 2015, pp. 1-2.

H. Gunes et al., "Categorical and dimensional affect analysis in continuous input: Current trends and future directions", Elsevier B. V., Image and Vision Computing 31, No. 2, 2013, pp. 120-136.

A.C. E.S. Lima et al., "A multi-label, semi-supervised classification approach applied to personality prediction in social media," Elsevier Ltd., Neural Networks 58, 2014, pp. 122-130.

* cited by examiner

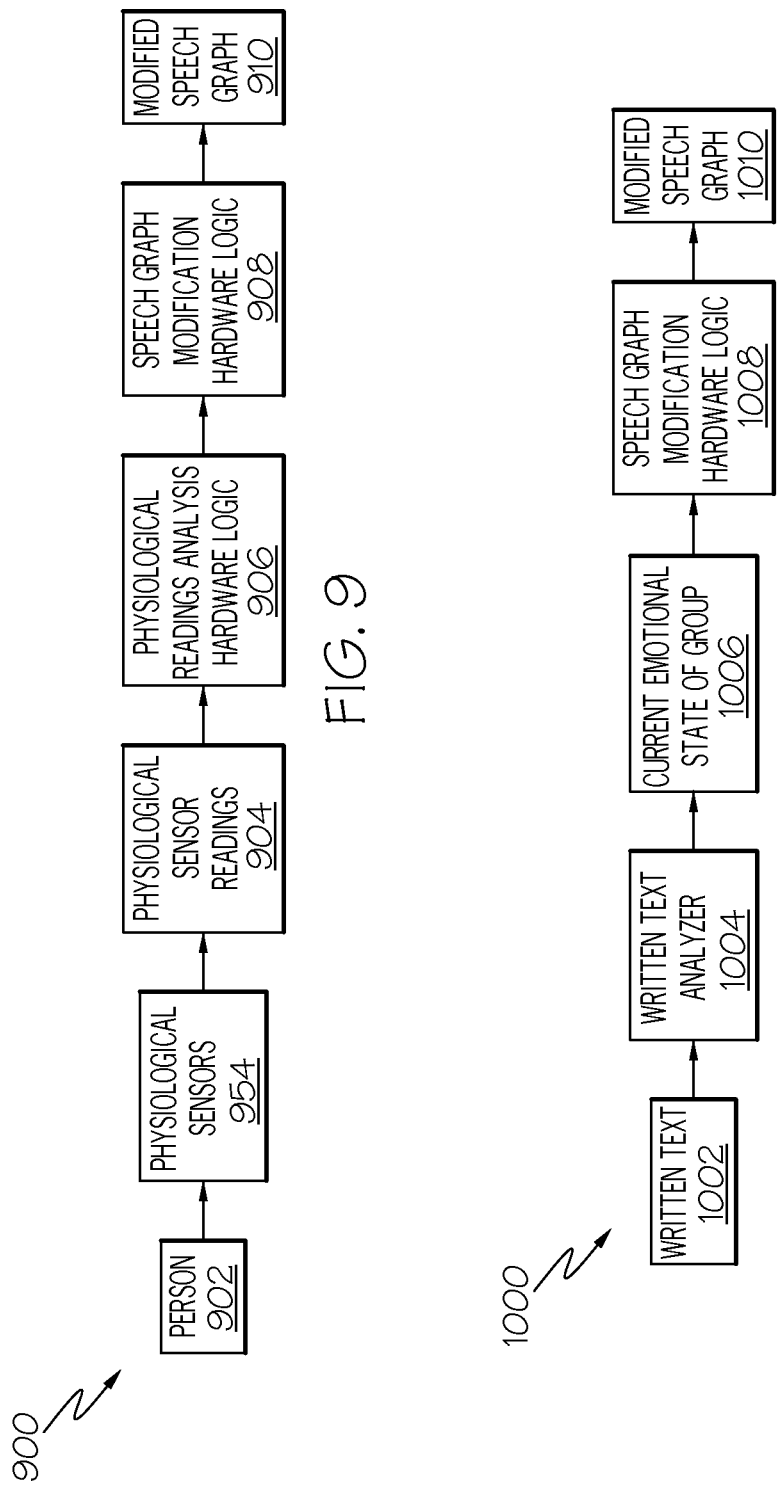

SEMANTIC-FREE TEXT ANALYSIS FOR IDENTIFYING TRAITS

BACKGROUND

The present disclosure relates to the field of computers, and specifically to the use of computers in analyzing text. Still more particularly, the present disclosure relates to analyzing speech patterns in verbal and/or written text in order to identify traits of a set of persons.

When evaluating speech, a common approach is to examine and evaluate what words a person is using. This is a fundamental component of communicating information, such as instructions, ideas, etc. However, speech analysis of words alone is often misleading, since this type of speech analysis only considers the semantics (meaning/definition) of the words.

SUMMARY

A method, system, and/or computer program product identifies speech traits of an entity, in order to predict a future state of an entity. Units of speech are collected from a stream of speech that is generated by a first entity. Tokens from the stream of speech are identified, where each token identifies a particular unit of speech from the stream of speech, and where identification of the tokens is semantic-free. Nodes in a first speech graph are populated with the tokens, and a first shape of the first speech graph is identified. The first shape is matched to a second shape, where the second shape is of a second speech graph from a second entity in a known category. The first entity is assigned to the known category, and a future state of the first entity is predicted based on the first entity being assigned to the known category.

BRIEF DESCRIPTION OF THE SEVERAL VIEWS OF THE DRAWINGS

FIG. 9 depicts a process for modifying a speech graph using physiological sensor readings for an individual; and FIG. 10 illustrates a process for modifying a speech graph for a group of persons based on their emotional state, which is reflected in written text associated with the group of persons.

DETAILED DESCRIPTION

Figure 1:
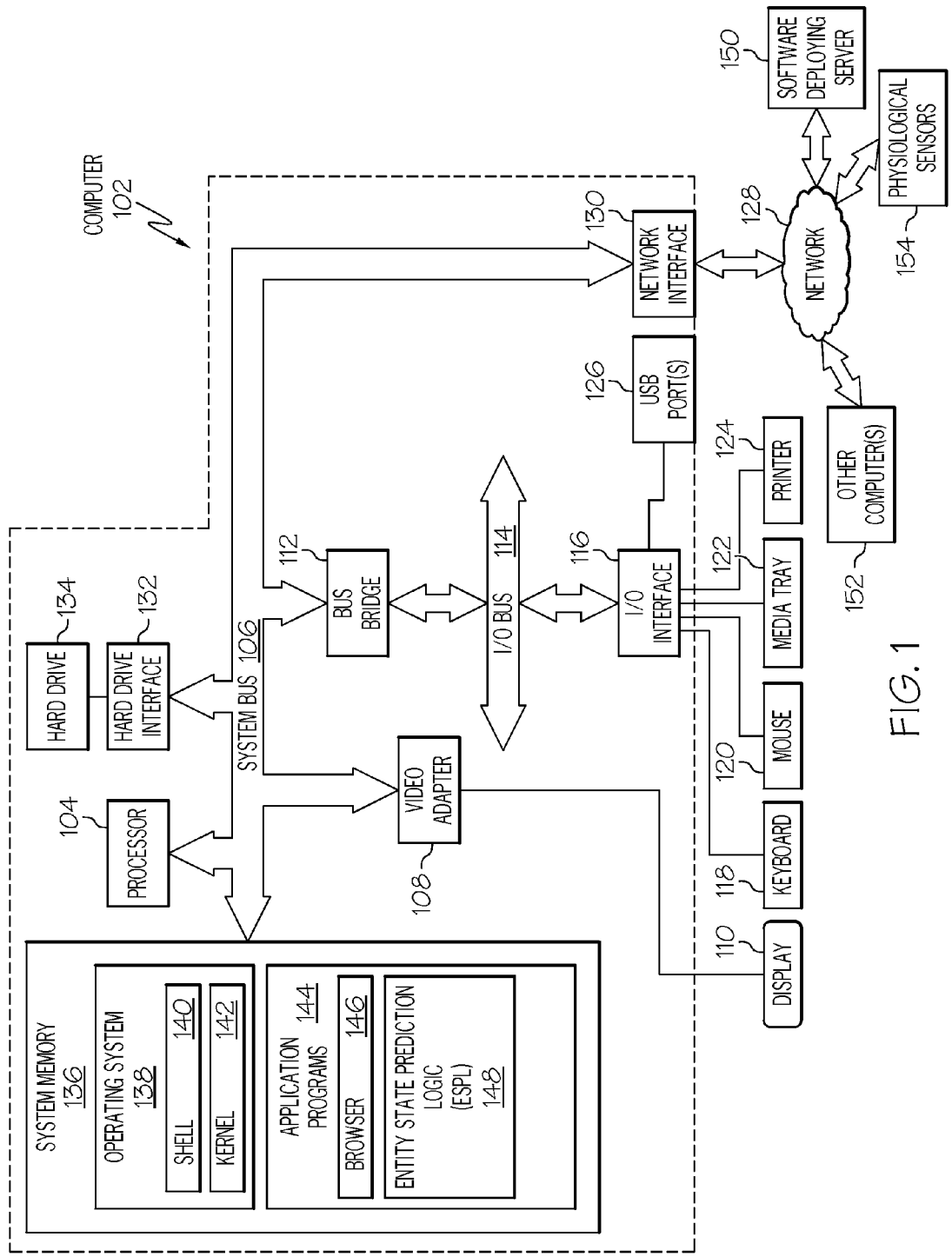
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 102 may be utilized by software deploying server 150 and/or other computer(s) 152.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include an Entity State Prediction Logic (ESPL) 148. ESPL 148 includes code for implementing the processes described below, including those described in FIGS. 2-10. In one embodiment, computer 102 is able to download ESPL 148 from software deploying server 150, including in an on-demand basis, wherein the code in ESPL 148 is not downloaded until needed for execution. Note further that, in one embodiment of the present invention, software deploying server 150 performs all of the functions associated with the present invention (including execution of ESPL 148), thus freeing computer 102 from having to use its own internal computing resources to execute ESPL 148.

Also coupled to computer 102 are physiological sensors 154, which are defined as sensors that are able to detect physiological states of a person. In one embodiment, these sensors are attached to the person, such as a heart monitor, a blood pressure cuff/monitor (sphygmomanometer), a galvanic skin conductance monitor, an electrocardiography (ECG) device, an electroencephalography (EEG) device, etc. In one embodiment, the physiological sensors 154 are part of a remote monitoring system, such as logic that interprets facial and body movements from a camera (either in real time or recorded), speech inflections, etc. to identify an emotional state of the person being observed. For example, voice interpretation may detect a tremor, increase in pitch, increase/decrease in articulation speed, etc. to identify an emotional state of the speaking person. In one embodiment, this identification is performed by electronically detecting the change in tremor/pitch/etc., and then associating that change to a particular emotional state found in a lookup table.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
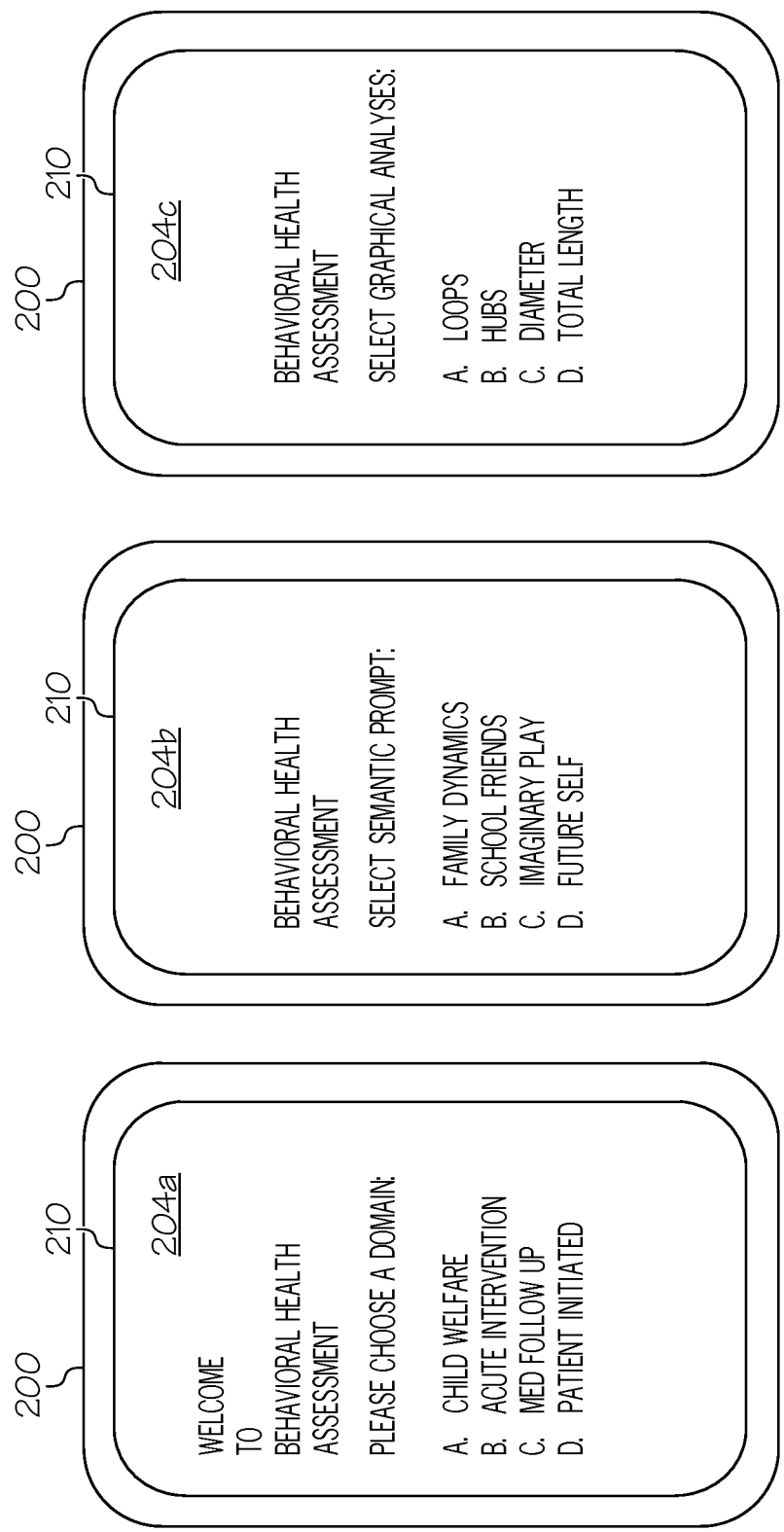
FIGS. 2a-2c, FIG. 3, and FIGS. 4a-4b illustrate an exemplary portable electronic device in which semantic-free speech analysis can be implemented.

With reference now to FIG. 2a, an exemplary electronic device 200, which may contain one or more inventive components of the present invention, is presented. Electronic device 200 may be implemented as computer 102 and/or other computer(s) 152 depicted in FIG. 1. As depicted in FIG. 2a through FIG. 4b, in one embodiment electronic device 200 may be a highly-portable device, such as a "smart" phone. In another embodiment, electronic device 200 may be a less portable device, such as a laptop/tablet computer, or electronic device 200 may be a fixed-location device, such as a desktop computer.

Electronic device 200 includes a display 210, which is analogous to display 110 in FIG. 1. Instructions related to and/or results from the processes described herein are presented on display 210 via various screens (i.e., displayed information). For example, initial parameter screens 204a-204c in corresponding FIGS. 2a-2c present information to be selected for initiating a behavioral health assessment. Assume that electronic device 200 is a smart phone (as depicted) that is being used by a social worker, educator, counselor, or other type of professional who is concerned about the behavioral health of a client/student/patient. As depicted in FIG. 2a, this professional is given multiple options in screen 204a from which to choose, where each of the options describes a particular subject matter. In the example shown, the user has selected the option "A. Child welfare". This selection of option A results in the display 210 displaying new screen 204b, which presents sub-categories of "Child welfare", including the selected option "D. Future self". That is, the user wants to prompt the child to discuss the child's future. This selection may derive from a user's desire to know if there is anything to indicate a problem with a particular child's future, including that child's self-esteem, actions that may be harmful to himself or others, etc. Alternately, in one embodiment the selection of this prompt may derive from a known correspondence between the type of speech produced by children in general when prompted in this way, and the usefulness of this speech in determining if a behavioral health problem exists. In the latter case, the user may not be specifically concerned about the child's future self, but instead, may want to determine with highest confidence if the child has been abused, and based on the user's experience, advice derived from the tool's documentation, professional publications on the matter, or general training on the use of the tool, the user decides that analyses of speech produced after this prompt will be most informative when making this determination. Given these possible motivations then, the user will choose option "D. Future self".

After choosing one or more of the options shown on screen 204b, another screen 204c populates the display 210, asking the user for a preferred type of graphical analysis to be performed on the child's speech pattern. In the example shown, the user has selected option "A. Loops" and "D. Total length". As described in further detail below, these selections let the system know that the user wants to analyze a speech graph for that child according to the quantity and/or size of loops found in the speech graph, as well as the total length of the speech graph (i.e., the nodal distance from one side of the speech graph to an opposite side of the speech graph, and/or how many nodes are in the speech graph, and/or a length of a longest unbranched string of nodes in the speech graph, etc.). The reason for the user choosing these analyses over others may derive from the user's experience, advice derived from the tool's documentation, professional publications on the matter, or general training on the use of the tool, so that these specific analyses of speech produced will be most informative when making the determination.

Figure 3:
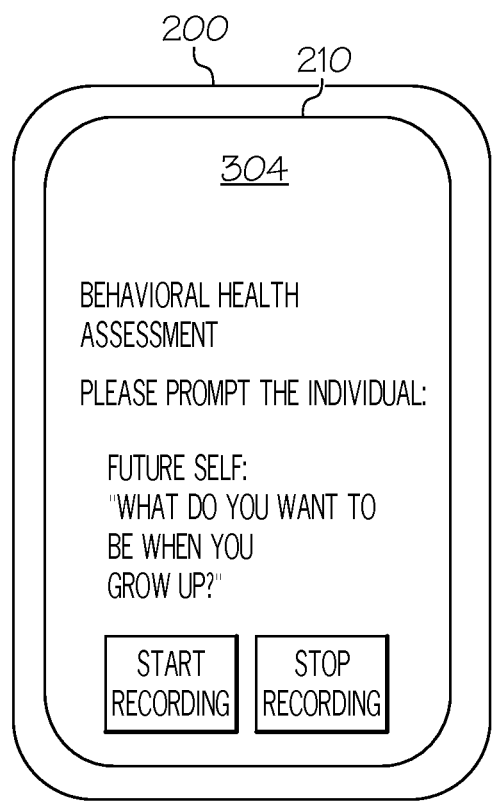

With reference now to FIG. 3, the electronic device now presents a prompt screen 304 on display 210, which prompts the user to start recording the child as he/she responds to the "future self" prompt "What do you want to be when you grow up?" This recording results in a sound file stored on the device, and subsequent speech to text-token analyses performed either on the device, or by a remote server communicatively coupled to the device which analyzes the sound file. The speech graph (described in detail below) is then produced, and is analyzed to assess the behavioral health of the child who is answering the question. This analysis then enables the prediction of a category of psychological states, experiences, or future acts, to which the child may belong. In one embodiment, the speech analysis describes both semantic and non-semantic characteristics of the child's speech. For example, in FIG. 4a, the semantic features revealed from the speech analysis show on analysis screen 404a that the words spoken and their meaning correspond semantically to a category of speech indicating well defined goals ("aspirations"), but at the same time doubts as to whether or not these goals will be reached in the future, as indicated by the words spoken, which are analyzed accordingly. The result of this analysis is presented as a semantic dot 406 on semantic radar chart 408.

Figure 4B:
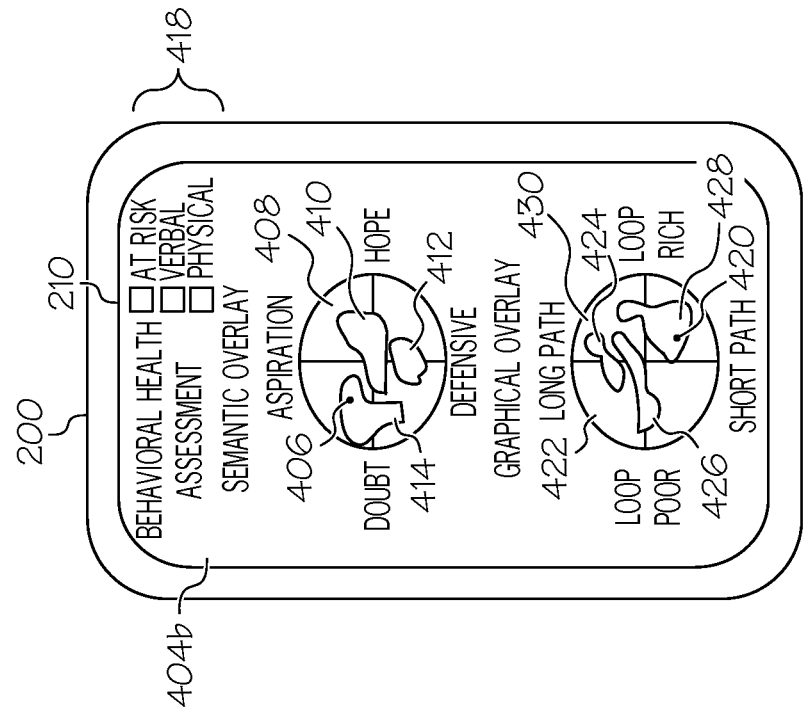

As depicted in the screen 404b in FIG. 4b, semantic radar chart 408 (along with semantic dot 406, indicating the current speech sample from the current child) is overlaid with semantic clouds 410, 412, and 414 to form a semantic overlay chart 416. As defined in legend 418, semantic cloud 410 indicates that a speaker is "at risk" of engaging in harmful behavior in the future; semantic cloud 412 indicates that a speaker is a victim of verbal abuse; and semantic cloud 414 indicates that the speaker is a victim of physical abuse. These semantic clouds (410, 412, 414) are the result of analyses of the meaning of words spoken by other persons who, respectively, are now known to have been at risk at the time their speech was recorded/analyzed (i.e., they eventually demonstrated harmful behavior after their speech was recorded), as indicated by semantic cloud 410, victims of verbal abuse (semantic cloud 412), and victims of physical abuse (semantic cloud 414). The scale and parameters used by semantic radar chart 408 and semantic overlay chart 416 are the same. Thus, since semantic dot 406 (for the child whose speech is presently being analyzed) falls within semantic cloud 414, the system determines that this child is being physically abused. Note that the label assigned to the individuals whose speech was analyzed and whose analyses created the corresponding semantic cloud need not have been assigned by the tool, by the tool's makers, or by users of the tool. Instead, the tool acts as a means to create the semantic clouds by analyses of speech graphs, and to associate with these clouds the primary label extracted from other determinations, for example those made by a behavioral health professional such as a psychiatrist or social worker.

However, the present invention need not rely on semantic features of the speech of a child or other person to determine if he/she is at risk or the victim of verbal/physical abuse. Rather, the semantic interpretation is used to modify graphical features of a speech chart, as described herein. That is, the present invention utilizes graphical features of a speech chart, which is semantic-dependent, to identify at risk persons and/or those who are the victims of abuse. This speech chart can then be adjusted according to the semantic meanings of the words spoken.

Figure 4A:
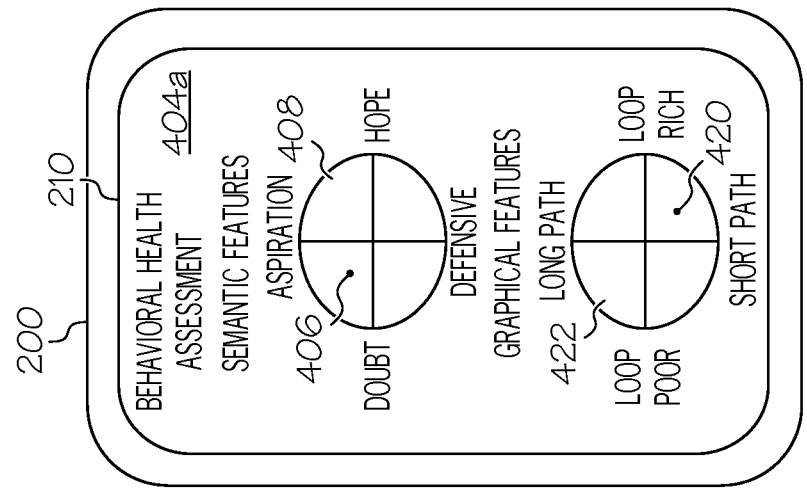

For example, in analysis screen 404*a* of FIG. 4*a*, a graphical dot 420 is displayed on a graphical radar graph 422. Graphical radar graph 422 describes only the physical shape/appearance of a speech graph, without regard to the meaning of any words that are used to make up the speech graph, and thus both the graphical radar graph 422 and the graphical dot 420 are semantic-independent (i.e., do not care what the words mean, but rather only care about the shape of the speech graph). In FIG. 4*a*, the graphical dot 420 indicates that the speech graph of the person whose speech is presently being analyzed has many loops ("Loop rich"), but there are no long chains of speech token nodes ("Short path").

With reference now to FIG. 4*b*, the graphical radar graph 422 is overlaid with graphical clouds 424, 426, and 428 (as well as graphical dot 420) to create a graphical overlay chart 430. As still defined in legend 418, graphical cloud 424 indicates by showing the region in the radar graph where past analyses of other labeled individuals' speech and their corresponding points fall, that a speaker is "at risk" of abuse in the future; graphical cloud 426 indicates that a speaker is in the same region as past victims of verbal abuse; and graphical cloud 428 indicates that the speaker is in the same region as past victims of physical abuse. These graphical clouds (424, 426, 428) are the result of analyzing the speech graphs (described in detail below) of words spoken by persons who, respectively, are now known to have been at risk (i.e., later fell victim to abuse) (graphical cloud 424), were past victims of verbal abuse (graphical cloud 426), and/or were past victims of physical abuse (graphical cloud 428), all of which are related to the time their speech was recorded/analyzed. The scale and parameters used by graphical radar chart 422 and graphical overlay chart 430 are the same. Thus, since graphical dot 420 (for the person whose speech is presently being analyzed) falls within graphical cloud 428, the system determines that this person is likely being physically abused.

Figure 5:
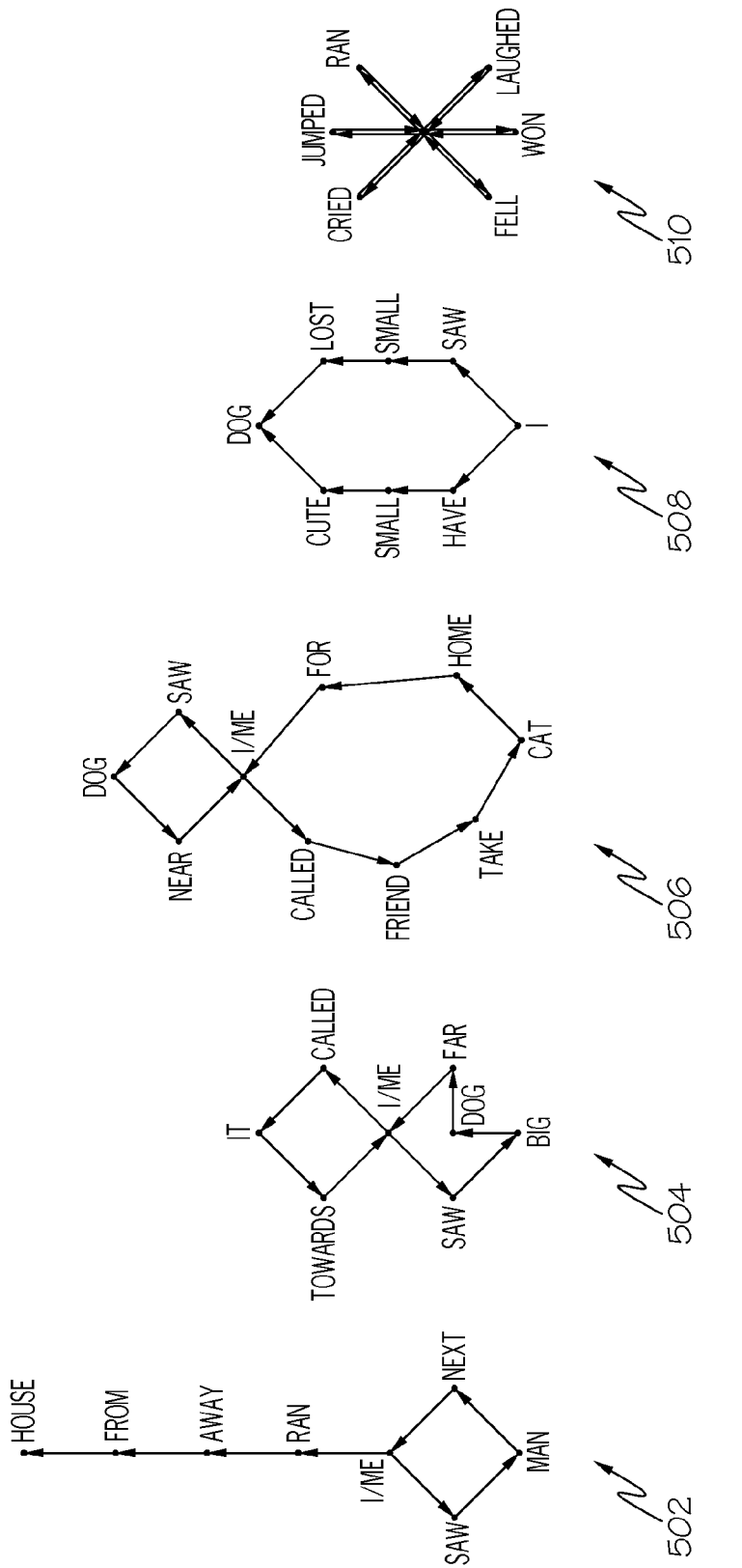
FIG. 5 depicts various speech graph shapes that may be used by the present invention.

As indicated above, the present invention relies not on the semantic meaning of words in a speech graph, but rather on a shape of the speech graph, in order to identify certain features of a speaker (e.g., being at risk, the victim of abuse, etc.). FIG. 5 thus depicts various speech graph shapes that may be used by the present invention to analyze the mental, emotional, and/or physical state of the person whose speech is being analyzed. Note that in one embodiment of the present invention, the meanings of the words that are used to create the nodes in the speech graphs shown in FIG. 5 are irrelevant. Rather, it is only the shape of the speech graphs that matters. This shape is based on the size of the speech graph (e.g., the distance from one side of the graph to the opposite side of the graph; how many nodes are in the graph, etc.); the level of branching between nodes in the graph; the number of loops in the graph; etc. Note that a loop may be for one or more nodes. For example, if the speaker said "Hello, Hello, Hello", this would result in a one-node loop in the speech graph, which recursively returns to the initial token/node for "Hello". If the speaker said "East is East", this would result in a two-node loop having two tokens/nodes ("East/is/(East)"), in which the loop goes from the node for "East" to the node "is" and then back to the node for "East". If the speaker said "I like the old me", then the tokens/nodes would be "I/like/old/(me)", thus resulting in a three-node loop. Additional speech graph shapes are depicted in FIG. 5.

With reference to speech graph 502 in FIG. 5, assume that the speaker said the following: "I saw a man next to me, and I ran away from my house." This sentence is then partitioned into units of speech called "tokens" (divided by slash marks), resulting in the tokens "I/saw/man/next/me/ran/away/from/house". These tokens then populate the token nodes (also simply called "nodes") that make up the speech graph 502. Notice that speech graph 502 has only one loop (I/saw/man/next), but is rather long dimensionally (i.e., from top to bottom), due to the unbranched token chain (I/ran/away/from/house). Note that speech graph 502 also has a branch at the node for "I", where the speech branches to the loop (saw/man/next) and then branches to the linear chain (ran/away/from/house). Note that the tokenization of speech herein described as corresponding to words, may or may not have a 1 to 1 correspondence as such. For example, analyses may tokenize phrases, or other communicative gestures, produced by an individual. In addition, the tokenization here takes recognized speech that has been transcribed by a human or by a speech to text algorithm. Such transcription may not be used in certain embodiments of the present invention. For example, an analysis of recorded speech may create tokens based on analysis of speech utterances that does not result in transcribed words. These tokens may for example represent the inverse mapping of speech sounds to a set of expected movement of the speaker's vocal apparatus (full glottal stop, fricative, etc.), and therefore may extend to speakers of various languages without the need for modification. In all embodiments, note that the tokens and their generation is semantic-independent. That is, it is the word itself, and not what the word means, that is being graphed, such that the speech graph is initially semantic-free.

Speech graph 504 is a graph of the speaker saying "I saw a big dog far away from me. I then called it towards me." The tokens/token nodes for this speech are thus "I/saw/big/ dog/far/me/I/called/it/towards/me". Note that speech graph 504 has no chains of tokens/nodes, but rather has just two loops. One loop has five nodes (I/saw/big/dog/far) and one loop has four nodes (I/called/it/towards), where the loops return to the initial node "I/me". While speech graph 504 has more loops than speech graph 502, it is also shorter (when measured from top to bottom) than speech graph 502. However, speech graph 504 has the same number of nodes (8) as speech graph 502.

Speech graph 506 is a graph of the speaker saying "I called my friend to take my cat home for me when I saw a dog near me." The tokens/token nodes for this speech are thus "I/called/friend/take/cat/home/for/(me)/saw/dog/near/(me)". While speech graph 506 also has only two loops, like speech graph 504, the size of speech graph 506 is much larger, both in distance from top to bottom as well as the number of nodes in the speech graph 506.

Speech graph 508 is a graph of the speaker saying "I have a small cute dog. I saw a small lost dog." This results in the tokens/token nodes "I/saw/small/lost/dog/(I)/have/small/cute/(dog)". Speech graph 508 has only one loop. Furthermore, speech graph 508 has parallel nodes for "small", which are the same tokens/token nodes for the adjective "small", but are in parallel pathways.

Speech graph 510 is a graph of the speaker saying "I jumped; I cried; I fell; I won; I laughed; I ran." Note that there are no loops in speech graph 510.

In one or more embodiments of the present invention, the speech graphs shown in FIG. 5 are then compared to speech graphs of persons having known features (i.e., are in known categories). For example, assume that 100 persons (a "cohort") speak in a manner that results in a speech graph whose shape is similar to that of speech graph 504 (loop rich; short paths), and these other persons all share a common trait (e.g., are victims of physical abuse). In this example, if the speech of a new person results in a similar speech graph shape as that shown for speech graph 504, then a conclusion is drawn that this new person may also be the victim of physical abuse. Based on this conclusion, future activities of that new person can also be predicted by examining known activities of members of the known cohort.

Figure 6:
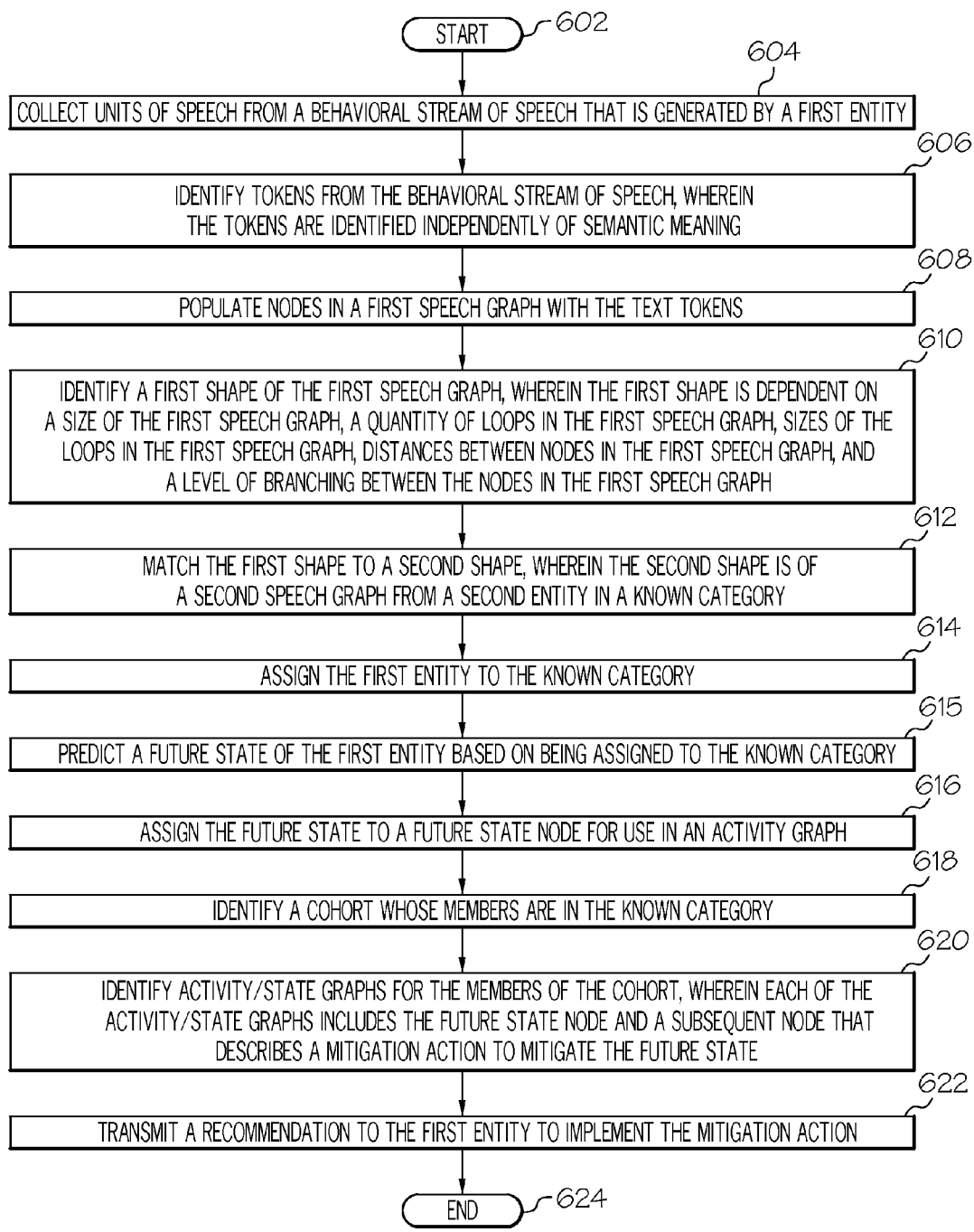
FIG. 6 is a high-level flowchart of one or more steps performed by one or more processors to predict a future state of an entity based on a speech shape of that entity.

With reference now to FIG. 6, a high-level flowchart of one or more steps performed by one or more processors to predict a future state of an entity based on a speech shape of that entity is presented. After initiator block 602, one or more processors collect units of speech from a stream of speech (block 604). The units of speech are words, lexemes, phrases, etc. that are parts of the stream of speech, which are generated by a first entity. In one embodiment, the speech is verbal speech. In one embodiment, the speech is text (written) speech. In one embodiment, the speech is non-language gestures/utterances (i.e., vocalizations, such as gasps, groans, etc. which do not produce words/phrases from any human language). In one embodiment, the first entity is a single person, while in another embodiment the first entity is a group of persons.

As described in block 606, tokens from the stream of speech are identified. Each token identifies a particular unit of speech from the stream of speech (e.g., a word, phrase, utterance, etc.). Note that identification of the tokens is semantic-free, such that the tokens are identified independently of a semantic meaning of a respective unit of speech. That is, the initial units of speech are independent of what the words/phrases/utterances themselves mean. Rather, it is only the shape of the speech graph that these units of speech generate that initially matters.

As described in block 608, one or more processors then populate nodes in a first speech graph with the tokens. That is, these tokens define the nodes that are depicted in the speech graph, such as those depicted in FIG. 5.

As described in block 610, one or more processors then identify a first shape of the first speech graph. For example, speech graph 502 in FIG. 5 is identified as having a shape of eight nodes, including a loop of four nodes and a linear string of five nodes. Thus, as described herein and in one embodiment, the first shape of the first speech graph is defined according to a size of the first speech graph, a quantity of loops in the first speech graph, sizes of the loops in the first speech graph, distances between nodes in the first speech graph, and a level of branching between the nodes in the first speech graph.

As described in block 612, one or more processors then match the first shape to a second shape, wherein the second shape is of a second speech graph from a second entity in a known category. For example, speech graph 504 in FIG. 5 has a particular shape. This particular shape is matched with another speech graph for other persons/entities that are in the known category (e.g., persons who are at risk for disease, harmful behavior, etc.; victims of abuse; etc.). As described in block 614, based on this match, the first entity is then assigned to that known category.

Figure 7:
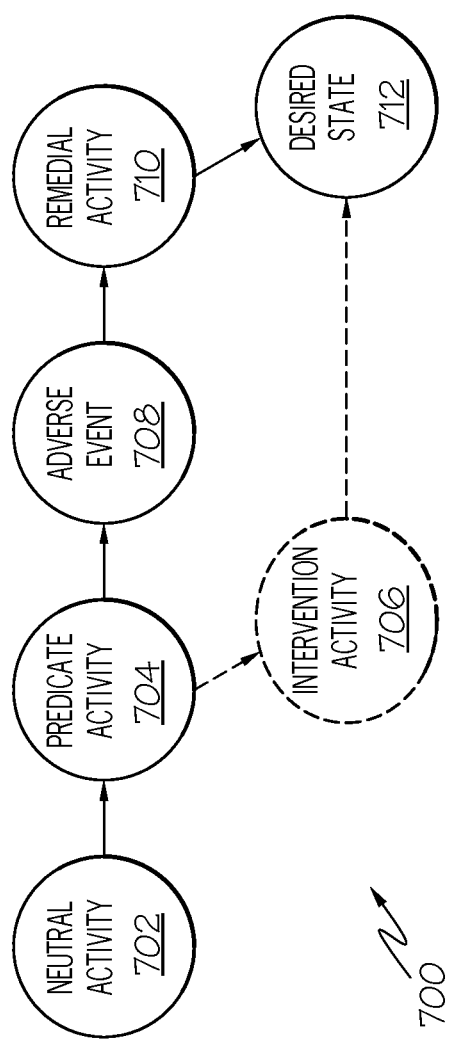
FIG. 7 illustrates an exemplary activity graph for remediating and/or avoiding an adverse event/state, through a use of speech graphs of a current entity and a known entity.

As described in block 615, one or more processors then predict a future state of the first entity based on the first entity being assigned to the known category. In order to explain in one embodiment how this future state is predicted, reference is now made to FIG. 7. FIG. 7 depicts an activity/state graph 700 of a group of persons, each of whom have demonstrated a particular speech profile (i.e., have presented a speech that resulted in a particularly shaped speech graph, such as one of those shown in FIG. 5). As described in block 612, this placed these persons in a particular behavioral category, in which certain common behavioral activity has been demonstrated/recorded. For example, these persons all performed some type of neutral activity 702, which may be speaking, traveling, working, etc. That is, the activities in this activity are neither useful, harmful, etc. per se. However, this neutral activity 702 historically has led (at least to a percentage of occurrences beyond some predetermined percentage/frequency) to a predicate activity 704. This predicate activity 704 is an activity that, without some intervention activity 706, has inevitably led to an adverse state, which in FIG. 7 is depicted as an adverse event 708. For example, the predicate activity 704 may be running away from home, which leads to the adverse event 708 of being assaulted on the street while homeless, unless a social worker intervenes and convinces the runaway to return home (intervention activity 706). However, if there is no intervention and the adverse event 708 occurs, then a remedial activity 710 (e.g., placing the runaway in a shelter) occurs, resulting in the desired state 712 (e.g., the health and safety of the runaway).

In another exemplary use case, assume that the activity/state graph 700 is related to pharmaceuticals. That is, assume that the neutral activity 702 is a patient taking a particular medication. Assume further that the predicate activity 704 is then eating shellfish. The adverse event 708 may be anaphylaxis, the remedial activity 710 use of an epinephrine pin, and the desired state 712 is being healthy. Similarly, the intervention activity 706 may be to issue a warning to the person who took the medication (in neutral activity 702) to avoid shellfish (e.g., where such warning is sent to his/her cell phone based on a GPS reading that this person is at a seafood restaurant).

Note that while only one intervention activity 706 and one remedial activity 710 are shown in FIG. 7, in one embodiment there may be multiple intervention activities 706 and/or remedial activities 710. That is, the group of persons (population) that generated data that resulted in activity/state graph 700 may have taken different remedial/intervention steps to reach the desired state 712. As such, which remediation/intervention is suggested to the first entity (e.g., a new patient taking the pharmaceutical) is 1) selected from these multiple intervention/remediation options base on 2) specific criteria for the first entity. For example, if one of the remedial activities 710 is to visit a Tier I hospital, and the first entity is 6 hours from the closest Tier I hospital, then this option would be eliminated for this first entity.

Continuing with FIG. 7, assume that a remedial activity 710 and/or intervention activity 706, which was successful in a larger population in reaching the desired state 712, was also used by the current first entity (e.g., a patient taking a certain pharmaceutical or a troubled young person). In certain cases, executing such a remediation/intervention will change the state of that first entity, thus potentially resulting in a change to their non-contextual speech graph. For example, assume that a person's non-contextual speech graph initially has a shape such as that shown for speech graph 502 in FIG. 5. Assume further that this speech graph 502 is indicative of that person being predisposed to a certain medical condition. However, after taking the remedial/intervention step suggested by the remedial activity 710 and/or intervention activity 706 nodes, this same person's speech graph may look more like that of speech graph 510, indicating 1) a reduced predisposition to the certain medical condition; 2) an increased predisposition to the certain medical condition; 3) an increased predisposition to another medical condition, etc.

Thus, by monitoring the changes to the non-contextual speech graph shape generated from the speech of persons from the population, then the selected intervention/remediation for the current person ("first entity") will be adjusted accordingly in order to recommend using the best intervention/remediation.

The pattern of behavior, activities, events, and states of activity graphs, such as the activity/state graph 700 shown in FIG. 7, are cohort dependent. Thus, if the current person, whose speech pattern is being monitored/established, is in that cohort, then a prediction is made that this person will travel along the same nodes depicted in FIG. 7. Thus, in one embodiment of the present invention, one or more processors assigns the future state/action (e.g., running away from home) to a future action node (e.g., the node for predicate activity 704 shown in FIG. 7) for use in an activity graph (e.g., activity/state graph 700), as described in block 616 of FIG. 6. One or more processors identify a cohort whose members are in the known category (block 618 of FIG. 6), and activity graphs for the members of that cohort are identified. As depicted in exemplary activity/state graph 700, each of the activity graphs includes the future state node and a subsequent node that describes a mitigation action to mitigate the future state (block 620). Once the correlation is made between the present person being evaluated and the cohort that follows the activity graph (e.g., activity/state graph 700), then one or more processors transmit a recommendation to the first entity to implement the mitigation action depicted in the activity graph (block 622). The process ends at terminator block 624. While the present invention has been described as relying solely on the shape of the speech graph, in one embodiment the contents (semantics, meaning) of the nodes in the speech graph are used to further augment the speech graph, in order to form a hybrid graph of both semantic and non-semantic information. For example, consider the system 800 depicted in FIG. 8. A text input 802 (e.g., from recorded speech of a person) is input into a syntactic feature extractor 804 and a semantic feature extractor 806. The syntactic feature extractor 804 identifies the context (i.e., syntax) of the words that are spoken/written, while the semantic feature extractor 806 identifies the standard definition of the words that are spoken/written. A graph constructor 808 generates a non-semantic graph (e.g., a graph such as those depicted in FIG. 5, in which the meaning of the words is irrelevant to the graph), and a graph feature extractor 810 then defines the shape features of the speech graph. These features, along with the syntax and semantics that are extracted respectively by syntactic feature extractor 804 and semantic feature extractor 806, generate a hybrid graph 812. This hybrid graph 812 starts with the original shape of the non-semantic graph, which has been modified according to the syntax/semantics of the words. For example, while a non-semantic speech graph may still have two loops of 4 nodes each, the hybrid graph will be morphed into slightly different shapes based on the meanings of the words that are the basis of the nodes in the non-semantic speech graph. These changes to the shape of the non-semantic speech graph may include making the speech graph larger or smaller (by "stretching" the graph in various directions), more or less angular, etc.

A learning engine 814 then constructs a predictive model/classifier, which reiteratively determines how well a particular hybrid graph matches a particular trait, activity, etc. of a cohort of persons. This predictive model/classifier is then fed into a predictive engine 816, which outputs (database 818) a predicted behavior and/or physiological category of the current person being evaluated.

Figure 8:
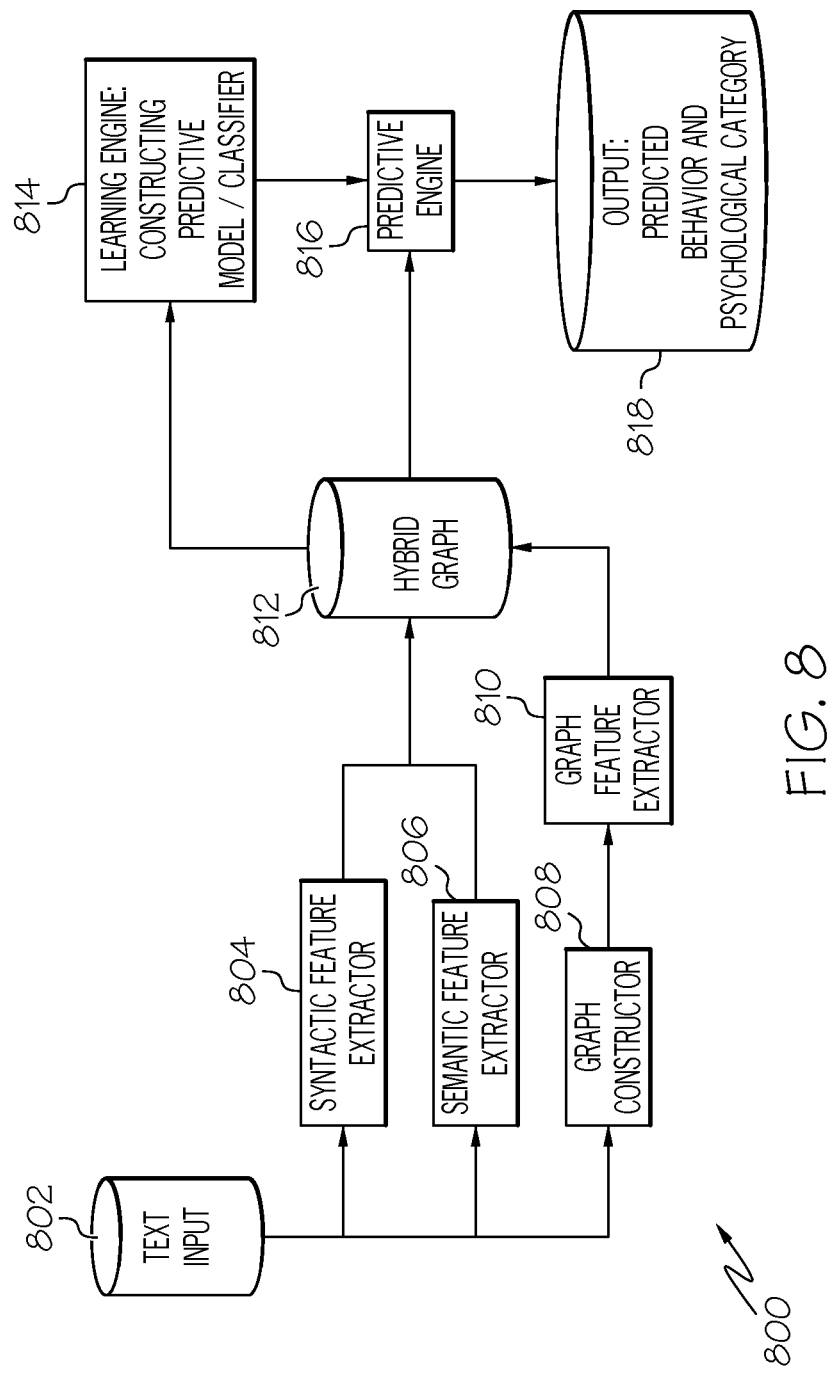
FIG. 8 depicts details of an exemplary graphical text analyzer in accordance with one or more embodiments of the present invention.

In one embodiment of the present invention, the graph constructor 808 depicted in FIG. 8 utilizes a graphical text analyzer, which utilizes the following process.

First, text (or speech-to-text if the speech begins as a verbal/oral source) is fed into a lexical parser that extracts syntactic features, which in their turn are vectorized. For instance, these vectors can have binary components for the syntactic categories verb, noun, pronoun, etc., such that the vector (0, 1, 0, 0, . . . ) that represents a noun-word.

The text is also fed into a semantic analyzer that converts words into semantic vectors. The semantic vectorization can be implemented in a number of ways, for instance using Latent Semantic Analysis. In this case, the semantic content of each word is represented by a vector whose components are determined by the Singular Value Decomposition of word co-occurrence frequencies over a large database of documents; as a result, the semantic similarity between two words a and b can be estimated by the scalar product of their respective semantic vectors:

$$sim(a,b)=\vec{w}_a \cdot \vec{w}_b.$$

A hybrid graph (G) is then created according to the formula:

$$G=\{N,E,\vec{W}\}$$

in which the nodes N represent words or phrases, the edges E represent temporal precedence in the speech, and each node possesses a feature vector $\vec{W}$ defined as a direct sum of the syntactic and semantic vectors, plus additional non-textual features (e.g. the identity of the speaker):

$$\vec{W}=\vec{w}_{syn} \oplus \vec{w}_{sem} \oplus \vec{w}_{ntxt}$$

The hybrid graph G is then analyzed based on a variety of features, including standard graph-theoretical topological measures of the graph skeleton $G_{sk}$:

$$G_{sk}=\{N,E\},$$

such as degree distribution, density of small-size motifs, clustering, centrality, etc. Similarly, additional values can be extracted by including the feature vectors attached to each node; one such instance is the magnetization of the generalized Potts model:

$$H = \sum_{n,m} E_{nm} \vec{W}_n \cdot \vec{W}_m$$

such that temporal proximity and feature similarity are taken into account.

These features, incorporating the syntactic, semantic and dynamic components of speech are then combined as a multi-dimensional features vector $\vec{F}$ that represents the speech sample. This feature vector is finally used to train a standard classifier M, where M is defined according to:

$$M=M(\vec{F}_{train}, C_{train})$$

to discriminate speech samples that belong to different conditions C, such that for each test speech sample the classifier estimates its condition identity based on the extracted features:

$$C(sample)=M(\vec{F}_{sample}),$$

Thus, in one embodiment of the present invention, wherein the first entity is a person, and wherein the stream of speech is composed of words spoken by the person, the method further comprises:

generating, by one or more processors, a syntactic vector ($\vec{w}_{syn}$) of the words, wherein the syntax vector describes a lexical class of each of the words;

creating, by one or processors, a hybrid graph (G) by combining the first speech graph and a semantic graph of the words spoken by the person, wherein the hybrid graph is created by:

converting, by one or more processors operating as a semantic analyzer, the words into semantic vectors, wherein a semantic similarity (sim(a,b)) between two words a and b are estimated by a scalar product (•) of their respective semantic vectors ($\vec{w}_a \cdot \vec{w}_b$), such that:

$$sim(a,b)=\vec{w}_a \cdot \vec{w}_b; \text{ and}$$

creating, by one or more processors, the hybrid graph (G) of the first speech graph and the semantic graph, where:

$$G=\{N,E,\vec{W}\}$$

wherein N are nodes, in the hybrid graph, that represent words, E represents edges that represent temporal precedence in the stream of speech, and $\vec{W}$ is a feature vector, for each node in the hybrid graph, and wherein $\vec{W}$ is defined as a direct sum of the syntactic vector ($\vec{w}_{syn}$) and semantic vectors ($\vec{w}_{sem}$), plus an additional direct sum of non-textual features ($\vec{w}_{ntxt}$) of the person speaking the words, such that:

$$\vec{W}=\vec{w}_{syn} \oplus \vec{w}_{sem} \oplus \vec{w}_{ntxt}.$$

In one embodiment of the present invention, physiological sensors are used to modify a speech graph. With reference now to FIG. 9, a flowchart 900 depicts such an embodiment. A person 902 is connected to (or otherwise monitored by) physiological sensors 954 (analogous to the physiological sensors 154 depicted in FIG. 1), which generate physiological sensor readings 904. These readings are fed into a physiological readings analysis hardware logic 906, which categorizes the readings. For example, the sensor readings may be categorized as indicating stress, fear, evasiveness, etc. of the person 902 when speaking. These categorized readings are then fed into a speech graph modification hardware logic 908, which generates a modified speech graph 910. That is, while an initial speech graph may correlate with speech graphs generated by persons who are intoxicated, readings from the physiological sensors 954 may indicate that they are actually having an adverse reaction to medication, and thus their representative speech graphs are modified accordingly.

Thus, in one embodiment of the present invention, the first entity is a person, the stream of speech is a stream of spoken words from the person, and the method further comprises: receiving, by one or more processors, a physiological measurement of the person from a sensor, wherein the physiological measurement is taken while the person is speaking the spoken words; analyzing, by one or more processors, the physiological measurement of the person to identify a current emotional (or other) state of the person; and modifying, by one or more processors, the first shape of the first speech graph according to the current emotional/other state of the person.

In one embodiment of the present invention, the speech graph is not for a single person, but rather is for a population. For example, a group (i.e., employees of an enterprise, citizens of a particular state/country, members of a particular organization, etc.) may have published various articles on a particular subject. However, "group think" often leads to an overall emotional state of that group (i.e., fear, pride, etc.), which is reflected in these writings. For example, the flowchart 1000 in FIG. 10 depicts such written text 1002 from a group being fed into a written text analyzer 1004. This reveals the current emotional state of that group (block 1006), which is fed into speech graph modification logic 1008 (similar to the speech graph modification hardware logic 908 depicted in FIG. 9), thus resulting in a modified speech graph 1010 (analogous to the modified speech graph 910 depicted in FIG. 9).

Thus, in one embodiment of the present invention, the first entity is a group of persons, the stream of speech is a stream of written texts from the group of persons, and the method further comprises: analyzing, by one or more processors, the written texts from the group of persons to identify a current emotional state of the group of persons; and modifying, by one or more processors, the first shape of the first speech graph according to the current emotional state of the group of persons. Based on this modification, one or more processors are then able to adjust a predicted future state of the group of persons based on a modified first shape of the first speech graph of the group of persons.

In accordance with one embodiment of the present invention, a system and method rapidly quantifies risk associated with a child's welfare. By applying a semantic-free analysis of text generated from recordings of speech during in-the-field interviews of children and caregivers by various behavioral health workers, a risk assessment is generated. This assessment derives from categories that allow clustering of individuals based on cognitive types. These categories provide input to a likelihood estimate for certain other related categories of "at risk" children. Automatic warnings to behavioral health workers, or automatic referrals to additional assessment may then be triggered, with the goal of deterring and preventing harm to children.

This embodiment thus overcomes the problem of screening in child welfare situations where cognitive and psychiatric conditions are by nature surreptitious and difficult to detect, and subject to self-concealment and intimidation. Objective categorization of these cognitive states using otherwise open sharing of speech communication patterns, for the purpose of screening and triggering intervention objectively and when appropriate, is therefore a pressing issue in society, especially where long interviews and psychiatric evaluation are cost prohibitive or impossible for large under-served populations.

Thus, speech of individual children and caregivers is recorded during a normal, free ranging interview conducted by a behavioral health care worker to create text tokens (words). These text tokens are analyzed by a graphical text analyzer using machine-learning tools, which extract predictive features from token sequences, and makes inferences about the category of the current cognitive category of a child, parent, or child-parent dual, their emotional state, and desires. Categories for each individual and corresponding cohorts are analyzed and compared, clustered, and used to create subsequent categories of risk or need based on cognitive types, thus permitting additional behavioral health screening, assistance, or a warning message to a behavioral health worker. Note that the conversations may also include conversations on a phone (or text chats on a phone) that may actually take place during an interview, or slightly before an interview.

In order to increase the confidence level C that a categorization is correct, a history of categorization may be maintained, along with how such categorization was useful, or not useful, in the context of security. Thus, using active learning, or related, current features and categorizations can be compared to past categorizations and features in order to improve accuracy. When people are travelling in groups (several children, several caregivers), a combined analysis of the group "as a whole" may be employed to boost confidence level C. Also note that, in one embodiment, this invention is optionally implemented in an opt-in fashion.

Thus, in one embodiment, a system and method analyzes text and/or "speech to text" as a graphical set of word or phrase vectors to categorize individual parents and children interviewed by a behavioral health worker. This prior speech and current speech of individuals relates the individuals to other categories of risk or need based on a metric of cognitive type correlation. In one embodiment, additional behavioral health screening, assistance, or a warning message to a behavioral health worker is automatically triggered. In one embodiment, the behavioral health worker is in the field and the system is implemented on a handheld device.

The construction of graphs representing structural elements of speech is based on a number of alternatives, such as syntactic value (article, noun, verb, adjective, etc.), or lexical root (run/ran/running) for the nodes of the graph, and text proximity for the edges of the graph. Graph features such as link degree, clustering, loop density, centrality, etc., represent speech structure.

Similarly, a number of alternatives are available to extract semantic vectors from the text, such as Latent Semantic Analysis and WordNet. These methods allow the computation of a distance between words and specific concepts (e.g. introspection, anxiety, depression), such that the text can be transformed into a field of distances to a concept, a field of fields of distances to the entire lexicon, or a field of distances to other texts including books, essays, chapters and textbooks.

The syntactic and semantic features may be combined either as "features" or as integrated fields, such as in a Potts model. Similarly, locally embedded graphs are constructed, so that a trajectory in a high-dimensional feature space is computed for each text. The trajectory is used as a measure of coherence of the speech, as well as a measure of distance between speech trajectories using methods such as Dynamic Time Warping.

The extracted multi-dimensional features are then used as predictors for psychological states (such as communication and cognitive style, or psychiatric disorders), based on training with pre-labeled interviews with test individuals. This method produces models that transform text into a field of numerical values that indicating the probability that a subject is belongs to a particular psychological or psychiatric category, or that he/she may enter a category in the near future.

Other data modalities can be similarly analyzed and correlated with text features and categorization to extend the analysis beyond speech.

In one embodiment of the present invention, a system and method for whole society monitoring and assessment is provided. That is, the processes and graphs used for an individual as described herein can also be applied to an entire community. A graphical text analysis processes speech or text as tokens or nodes in a graph, and then uses these speech or text tokens and the topological motif traversed during an individual's or group of individuals' speech behavior to predict a cognitive category. This system and method assesses if an entire society or enterprise has traversed a cognitive risk threshold.

Historical analyses of compiled text from more than 100 years of a society's newspapers has currently correlated text analytic categories with the periodic civil wars and unrest that were historically recorded for the society/region. After discovering these historical topological motifs, the problem of creating objective forecasts and predictions for a society, economy, or enterprise as a whole becomes addressable. Such a system would address the need to have broad societal and enterprise monitoring of overall stress levels and cognitive functioning within an organization or society as a whole.

Thus, in this embodiment, speech and text outputs of individual societies or organizations are recorded during normal functioning of the society or organization to create text tokens. These text tokens are analyzed by a graphical text analyzer using machine-learning tools that extract predictive features from token sequences, and makes inferences about the category of the current cognitive category of a society or organization. Categories for each societal group are analyzed and compared, clustered, and used to create subsequent categories of risk or need based on cognitive types. Input may include text of newspapers, tweets, journals, magazines, web pages, etc. In one embodiment, this may be also used to trigger financial recommendations decisions, such as stock purchases or advice on stock purchases. In some cases, a web page crawler may be used to ingest text.

Thus, this embodiment provides a system and method that analyzes text and speech to text as a graphical set of word or phrase vectors to categorize broad samples of output from a society or enterprise. In one embodiment, the prior speech and current speech of organizations relates the societies or organizations to other categories of risk or need based on a metric of cognitive type correlation. In one embodiment, additional societal or organizational health screening, assistance, or a warning message to an organization's health committee or worker is automatically triggered. In one embodiment, prior semantic measures produce a prior Bayesian overlay of expected cognitive category and the expected overlay is used to augment a graphical analysis of text.

In one embodiment of the present invention, a method detects, through graphical text analysis, when a cognitive category of a subject is about to become abnormal or indicate an unproductive or otherwise bad cognitive state by drawing upon a larger group. The system triggers a broader computation of the graphical text analyzer for the subject's family, team or other affiliation network to extract additional evidence for a categorization. If something is notable, the system then continues and analyzes town, department or enterprise as a whole. This creates a hierarchical triggering of complex or percolating text-graphs for subsequent analyses, providing clear breakpoints for remediation and intervention from the larger supporting structure.

Thus, in this embodiment, often the solution to an individual's cognitive problem lies in a larger group which as a whole is not experiencing the problem. Identifying the appropriate hierarchical group level at which to seek a solution or other mitigating action is difficult given the unknowns in current organization communication networks.

Thus, a graphical text analysis of current speech of all subjects in a group or organization to is performed to categorize cognitive states individually or at group levels. A stochastic process underlying the observed sequences of speech and category events is modeled (i.e., as a particular learned trajectory of a stochastic process with certain parameters).

For example, consider a larger data set of people and cluster people in groups with similar parameters. With an overlay from life event sequences, inter-subject and inter-group variability are captured via Markov chain parameters conditioned by cognitive state categories. When an individual problem is identified, containing sets are traversed to identify where the problem ends, and automatically trigger a mitigating action originating from the larger, normal functioning group, to the individual with a problem.

This embodiment creates a hierarchical triggering of complex or percolating text-graphs for subsequent analyses, providing clear breakpoints for remediation and intervention from the larger supporting structure. For example, an analysis at a lower level of a hierarchy (small business team) may trigger an analysis of a higher level (e.g. department or even the entire company). This may also be applied to clubs, civic organizations, emergency responders who work in hierarchies, etc.

Thus, in one embodiment of the present invention, a system and method analyzes text and speech to text as a graphical set of word or phrase vectors to categorize individuals and groups to which individuals or groups belong, where the prior speech and current speech of individuals or groups relates the individuals and groups to other categories of risk or need based on a metric of cognitive type correlation. The smallest group where the cognitive state is distinct and of a better quality than an individual's is determined, and additional behavioral health advice, suggestions for assistance, or a warning message to the group is automatically triggered. In one embodiment, the group is advised on how to best help the individual based on an automated question posed to a behavioral health Deep Question/Answer (QA) system, in which a computer system directly and precisely answers natural language questions over an open and broad range of knowledge.

Other data modalities can be similarly analyzed and correlated with text features and categorization to extend the analysis beyond speech.

Note that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method of predicting a future state of an entity, the method comprising:
    collecting, by one or more processors, units of speech from a stream of speech, wherein the stream of speech is generated by a first entity;
    identifying, by one or more processors, tokens from the stream of speech, wherein each token identifies a particular unit of speech from the stream of speech, and wherein identification of the tokens is semantic-free such that the tokens are identified independently of a semantic meaning of a respective unit of speech;
    populating, by one or more processors, nodes in a first speech graph with the tokens;
    identifying, by one or more processors, a first shape of the first speech graph;
    matching, by one or more processors, the first shape to a second shape, wherein the second shape is of a second speech graph from a second entity in a known category;
    assigning, by one or more processors, the first entity to the known category in response to the first shape matching the second shape; and
    predicting, by one or more processors, a future state of the first entity based on the first entity being assigned to the known category.

2. The method of claim 1, further comprising:
    assigning, by one or more processors, the future state to a future state node for use in an activity graph;
    identifying, by one or more processors, a cohort whose members are in the known category;
    identifying, by one or more processors, activity graphs for the members of the cohort, wherein each of the activity graphs includes the future state node and a subsequent node that describes a mitigation action to mitigate the future state; and
    transmitting, by one or more processors, a recommendation to the first entity to implement the mitigation action.

3. The method of claim 1, wherein the entity is a person, wherein the future state is a future action performed by the person, and wherein the method further comprises:
    determining, by one or more processors, an efficacy of a particular action in reaching a predetermined desired state by members of a cohort, wherein the particular action is from a group of actions performed by one or more members of the cohort;

identifying, by one or more processors, a preferred action that has a highest efficacy compared to other actions from the group of actions; and transmitting, by one or more processors, a recommendation to perform the preferred action as the future action performed by the person.

4. The method of claim 3, further comprising:

comparing, by one or more processors, a pre-action speech graph for members of the cohort to a post-action speech graph, wherein the pre-action speech graph is based on non-contextual speech patterns of the members of the cohort before taking the particular action, and wherein the post-action speech graph is based on non-contextual speech patterns of the members of the cohort after taking the particular action; and identifying, by one or more processors, the preferred action based on a change in a shape of the pre-action speech graph and a shape of the post-action speech graph.

5. The method of claim 1, further comprising:

defining, by one or more processors, the first shape of the first speech graph according to a size of the first speech graph, a quantity of loops in the first speech graph, sizes of the loops in the first speech graph, distances between nodes in the first speech graph, and a level of branching between the nodes in the first speech graph.

6. The method of claim 1, wherein the first entity is a person, wherein the stream of speech is a stream of spoken words from the person, and wherein the method further comprises:

receiving, by one or more processors, a physiological measurement of the person from a sensor, wherein the physiological measurement is taken while the person is speaking the spoken words;

analyzing, by one or more processors, the physiological measurement of the person to identify a current emotional state of the person; and modifying, by one or more processors, the first shape of the first speech graph according to the current emotional state of the person.

7. The method of claim 1, wherein the first entity is a group of persons, wherein the stream of speech is a stream of written texts from the group of persons, and wherein the method further comprises:

analyzing, by one or more processors, the written texts from the group of persons to identify a current emotional state of the group of persons;

modifying, by one or more processors, the first shape of the first speech graph according to the current emotional state of the group of persons; and adjusting, by one or more processors, a predicted future state of the group of persons based on a modified first shape of the first speech graph of the group of persons.

8. The method of claim 1, wherein the first entity is a person, wherein the stream of speech is composed of words spoken by the person, and wherein the method further comprises:

generating, by one or more processors, a syntactic vector ($\vec{w}_{syn}$) of the words, wherein the syntactic vector describes a lexical class of each of the words;

creating, by one or processors, a hybrid graph (G) by combining the first speech graph and a semantic graph of the words spoken by the person, wherein the hybrid graph is created by:

converting, by one or more processors operating as a semantic analyzer, the words into semantic vectors, wherein a semantic similarity (sim(a,b)) between two words a and b are estimated by a scalar product (•) of their respective semantic vectors ($\vec{w}_a \cdot \vec{w}_b$), such that:

$$sim(a,b) = \vec{w}_a \cdot \vec{w}_b; \text{ and}$$

creating, by one or more processors, the hybrid graph (G) of the first speech graph and the semantic graph, where:

$$G = \{N, E, \vec{W}\}$$

wherein N are nodes, in the hybrid graph, that represent words, E represents edges that represent temporal precedence in the stream of speech, and $\vec{W}$ is a feature vector, for each node in the hybrid graph, and wherein $\vec{W}$ is defined as a direct sum of the syntactic vector ($\vec{w}_{syn}$) and semantic vectors ($\vec{w}_{sem}$), plus an additional direct sum of non-textual features ($\vec{w}_{ntxt}$) of the person speaking the words, such that:

$$\vec{W} = \vec{w}_{syn} \oplus \vec{w}_{sem} \oplus \vec{w}_{ntxt}.$$

9. The method of claim 1, wherein the stream of speech comprises spoken non-language gestures from the first entity.

10. A computer program product for predicting a future state of an entity, the computer program product comprising a computer readable storage medium having program code embodied therewith, the program code readable and executable by a processor to perform a method comprising:

collecting units of speech from a stream of speech, wherein the stream of speech is generated by a first entity;

identifying tokens from the stream of speech, wherein each token identifies a particular unit of speech from the stream of speech, and wherein identification of the tokens is semantic-free such that the tokens are identified independently of a semantic meaning of a respective unit of speech;

populating nodes in a first speech graph with the tokens;

identifying a first shape of the first speech graph;

matching the first shape to a second shape, wherein the second shape is of a second speech graph from a second entity in a known category;

assigning the first entity to the known category in response to the first shape matching the second shape; and predicting a future state of the first entity based on the first entity being assigned to the known category.

11. The computer program product of claim 10, wherein the method further comprises:

assigning the future state to a future state node for use in an activity graph;

identifying a cohort whose members are in the known category;

identifying activity graphs for the members of the cohort, wherein each of the activity graphs includes the future state node and a subsequent node that describes a mitigation action to mitigate the future state; and transmitting a recommendation to the first entity to implement the mitigation action.

12. The computer program product of claim 10, wherein the method further comprises:

defining the first shape of the first speech graph according to a size of the first speech graph, a quantity of loops in the first speech graph, sizes of the loops in the first speech graph, distances between nodes in the first speech graph, and a level of branching between the nodes in the first speech graph.

13. The computer program product of claim 10, wherein the first entity is a person, wherein the stream of speech is a stream of spoken words from the person, and wherein the method further comprises:

receiving a physiological measurement of the person from a sensor, wherein the physiological measurement is taken while the person is speaking the spoken words;

analyzing the physiological measurement of the person to identify a current emotional state of the person; and modifying the first shape of the first speech graph according to the current emotional state of the person.

14. The computer program product of claim 10, wherein the first entity is a person, wherein the stream of speech is composed of words spoken by the person, and wherein the method further comprises:

generating a syntactic vector ($\vec{w}_{syn}$) of the words, wherein the syntactic vector describes a lexical class of each of the words;

creating a hybrid graph (G) by combining the first speech graph and a semantic graph of the words spoken by the person, wherein the hybrid graph is created by:

converting, by a semantic analyzer, the words into semantic vectors, wherein a semantic similarity (sim(a,b)) between two words a and b are estimated by a scalar product (•) of their respective semantic vectors ($\vec{w}_a \cdot \vec{w}_b$) such that:

$$sim(a,b) = \vec{w}_a \cdot \vec{w}_b; \text{ and}$$

creating, by one or more processors, the hybrid graph (G) of the first speech graph and the semantic graph, such that:

$$G = \{N, E, \vec{W}\}$$

wherein N are nodes, in the hybrid graph, that represent words, E represents edges that represent temporal precedence in the stream of speech, and $\vec{W}$ is a feature vector, for each node in the hybrid graph, that is defined as a direct sum of the syntactic vector ($\vec{w}_{syn}$) and semantic vectors ($\vec{w}_{sem}$), plus an additional direct sum of non-textual features ($\vec{w}_{ntxt}$) of the person speaking the words, such that:

$$\vec{W} = \vec{w}_{syn} \oplus \vec{w}_{sem} \oplus \vec{w}_{ntxt}.$$

15. A computer system comprising:

a processor, a computer readable memory, and a computer readable storage medium;

first program instructions to collect units of speech from a stream of speech, wherein the stream of speech is generated by a first entity;

second program instructions to identify tokens from the stream of speech, wherein each token identifies a particular unit of speech from the stream of speech, and wherein identification of the tokens is semantic-free such that the tokens are identified independently of a semantic meaning of a respective unit of speech;

third program instructions to populate nodes in a first speech graph with the tokens;

fourth program instructions to identify a first shape of the first speech graph;

fifth program instructions to match the first shape to a second shape, wherein the second shape is of a second speech graph from a second entity in a known category;

sixth program instructions to assign the first entity to the known category in response to the first shape matching the second shape; and seventh program instructions to predict a future state of the first entity based on the first entity being assigned to the known category; and wherein the first, second, third, fourth, fifth, sixth, and seventh program instructions are stored on the computer readable storage medium and executed by the processor via the computer readable memory.

16. The computer system of claim 15, further comprising:

eighth program instructions to assign the future state to a future state node for use in an activity graph;

ninth program instructions to identify a cohort whose members are in the known category;

tenth program instructions to identify activity graphs for the members of the cohort, wherein each of the activity graphs includes the future state node and a subsequent node that describes a mitigation action to mitigate the future state; and eleventh program instructions to transmit a recommendation to the first entity to implement the mitigation action; and wherein the eighth, ninth, tenth, and eleventh program instructions are stored on the computer readable storage medium and executed by the processor via the computer readable memory.

17. The computer system of claim 15, further comprising:

eighth program instructions to define the first shape of the first speech graph according to a size of the first speech graph, a quantity of loops in the first speech graph, sizes of the loops in the first speech graph, distances between nodes in the first speech graph, and a level of branching between the nodes in the first speech graph; and wherein the eighth program instructions are stored on the computer readable storage medium and executed by the processor via the computer readable memory.

18. The computer system of claim 15, wherein the first entity is a person, wherein the stream of speech is a stream of spoken words from the person, and wherein the computer system further comprises:

eighth program instructions to receive a physiological measurement of the person from a sensor, wherein the physiological measurement is taken while the person is speaking the spoken words;

ninth program instructions to analyze the physiological measurement of the person to identify a current emotional state of the person; and tenth program instructions to modify the first shape of the first speech graph according to the current emotional state of the person; and wherein the eighth, ninth, and tenth program instructions are stored on the computer readable storage medium and executed by the processor via the computer readable memory.

19. The computer system of claim 15, wherein the first entity is a group of persons, wherein the stream of speech is a stream of written texts from the group of persons, and wherein the computer system further comprises:

eighth program instructions to analyze the written texts from the group of persons to identify a current emotional state of the group of persons;

ninth program instructions to modify the first shape of the first speech graph according to the current emotional state of the group of persons; and tenth program instructions to adjust a predicted future state of the group of persons based on a modified first shape of the first speech graph of the group of persons; and wherein the eighth, ninth, and tenth program instructions are stored on the computer readable storage medium and executed by the processor via the computer readable memory.

20. The computer system of claim 15, wherein the first entity is a person, wherein the stream of speech is composed of words spoken by the person, and wherein the computer system further comprises:

eighth program instructions to generate a syntactic vector ($\vec{w}_{syn}$) of the words, wherein the syntactic vector describes a lexical class of each of the words; and ninth program instructions to create a hybrid graph (G) by combining the first speech graph and a semantic graph of the words spoken by the person, wherein the hybrid graph is created by:

converting, by a semantic analyzer, the words into semantic vectors, wherein a semantic similarity (sim(a,b)) between two words a and b are estimated by a scalar product (•) of their respective semantic vectors ($\vec{w}_a, \vec{w}_b$), such that:

$$sim(a,b)=\vec{w}_a \cdot \vec{w}_b;$$ and creating, by one or more processors, the hybrid graph (G) of the first speech graph and the semantic graph, such that:

$$G=\{N,E,\vec{W}\}$$

wherein N are nodes, in the hybrid graph, that represent words, E represents edges that represent temporal precedence in the stream of speech, and $\vec{W}$ is a feature vector, for each node in the hybrid graph, that is defined as a direct sum of the syntactic vector ($\vec{w}_{syn}$) and semantic vectors ($\vec{w}_{sem}$), plus an additional direct sum of non-textual features ($\vec{w}_{ntxt}$) of the person speaking the words, such that:

$$\vec{W}=\vec{w}_{syn} \oplus \vec{w}_{sem} \oplus \vec{w}_{ntxt};$$

and wherein the eighth and ninth program instructions are stored on the computer readable storage medium and executed by the processor via the computer readable memory.

* * * * *